United States Patent [19]

Cooke

[11] Patent Number: 5,746,188
[45] Date of Patent: May 5, 1998

[54] APPARATUS FOR SUPPLYING FUEL TO AN INTERNAL COMBUSTION ENGINE

[76] Inventor: Syd L. Cooke, 1451 Rocky Ridge Dr., #2215, Roseville, Calif. 95661

[21] Appl. No.: 662,605

[22] Filed: Jun. 13, 1996

[51] Int. Cl.⁶ .................................................. F02M 31/00
[52] U.S. Cl. .................................................. 123/549; 123/557
[58] Field of Search .................................. 123/543, 545, 123/547, 549, 557, 568, 569

[56] References Cited

U.S. PATENT DOCUMENTS

| | | | |
|---|---|---|---|
| 1,980,496 | 11/1934 | Musselwhite | 123/557 |
| 2,576,450 | 11/1951 | Marval | 123/549 |
| 3,380,442 | 4/1968 | Johnson | 123/549 |
| 3,667,436 | 6/1972 | Reichhelm | 123/549 |
| 4,083,340 | 4/1978 | Furr et al. | 123/557 |
| 4,275,699 | 6/1981 | Troglin | 123/549 |
| 5,291,870 | 3/1994 | Covey | 123/557 |
| 5,379,728 | 1/1995 | Cooke | 123/557 |
| 5,515,814 | 5/1996 | Cooke | 123/557 |

*Primary Examiner*—Marguerite McMahon
*Attorney, Agent, or Firm*—Thomas R. Lampe

[57] ABSTRACT

Apparatus for heating and vaporizing a liquid hydrocarbon fuel supplied to an internal combustion engine includes a housing having an inlet and an outlet. Spaced baffle members are located within the interior of the housing which divide the housing into segments. Openings are provided in the baffle members which allow for the passage of the fuel and cause the fuel to deviate from a straight line during passage through the housing. The baffle members and the housing are heated to promote vaporization of the liquid hydrocarbon fuel. Exhaust may be introduced into the interior of the housing and mixed with the vaporized and heated fuel. Further heating of the mixture can result in reformation of at least some of the mixture prior to its introduction into an internal combustion engine.

14 Claims, 5 Drawing Sheets

APPARATUS FOR SUPPLYING FUEL TO AN INTERNAL COMBUSTION ENGINE

TECHNICAL FIELD

This invention relates to apparatus for use with an internal combustion engine for supplying fuel to the internal combustion engine. More particularly, the apparatus is utilized to heat, vaporize and otherwise treat liquid hydrocarbon fuel to promote engine efficiency and lower emissions.

BACKGROUND ART

It is known that the heating and vaporization of gasoline and other types of liquid hydrocarbon fuels can increase efficiency or improve the performance of internal combustion engines. Arrangements for accomplishing such objectives are generally characterized by their complexity and relatively high expense. Reliability is also a problem and devices of this type have not found widespread acceptance for these and other reasons.

My U.S. Pat. No. 5,515,814, issued May 14, 1996, discloses an apparatus and method for supplying fuel to an internal combustion engine. My U.S. Pat. No. 5,379,728, issued Jan. 10, 1995, also discloses an apparatus and method for supplying fuel to an internal combustion engine. In the systems disclosed in these patents a liquid hydrocarbon fuel is injected into a fuel chamber to form a mixture of vaporized liquid hydrocarbon fuel and heated exhaust gases. The mixture is passed through a passageway and further heated by non-contacting exhaust gases from the internal combustion engine to reform at least a portion of the mixture of vaporized liquid hydrocarbon fuel and heated exhaust gases in the passageway.

DISCLOSURE OF INVENTION

The apparatus of the present invention is characterized by its relative simplicity of construction and compactness. No catalysts are required for its operation. The apparatus is further characterized by its high reliability during operation. Employment of the apparatus will serve to lower emissions and the apparatus may be readily installed in association with virtually any type of internal combustion engine, including those of cars and other vehicles.

The apparatus of the present invention is for use with an internal combustion engine and is for supplying fuel to the internal combustion engine.

The apparatus includes housing means defining a housing interior, the housing means defining an inlet and an outlet. The inlet and the outlet are spaced from one another and communicate with the housing interior. The inlet is for receiving liquid hydrocarbon fuel and introducing the liquid hydrocarbon fuel into the housing interior.

A plurality of spaced baffle members are located within the housing interior. The baffle members divide the housing interior into housing interior segments and each of the baffle members defines at least one opening allowing passage of the liquid hydrocarbon fuel between adjacent housing interior segments as the liquid hydrocarbon fuel passes through the housing interior from the inlet to the outlet.

Heating means is provided for heating the baffle members. The baffle members heated by the heating means heat and promote the vaporization of the liquid hydrocarbon fuel as the liquid hydrocarbon fuel passes through the housing interior from the inlet to the outlet.

Other features, advantages, and objects of the present invention will become apparent with reference to the following description and accompanying drawings.

BEST MODE FOR CARRYING OUT THE INVENTION

Figures 1, 2:
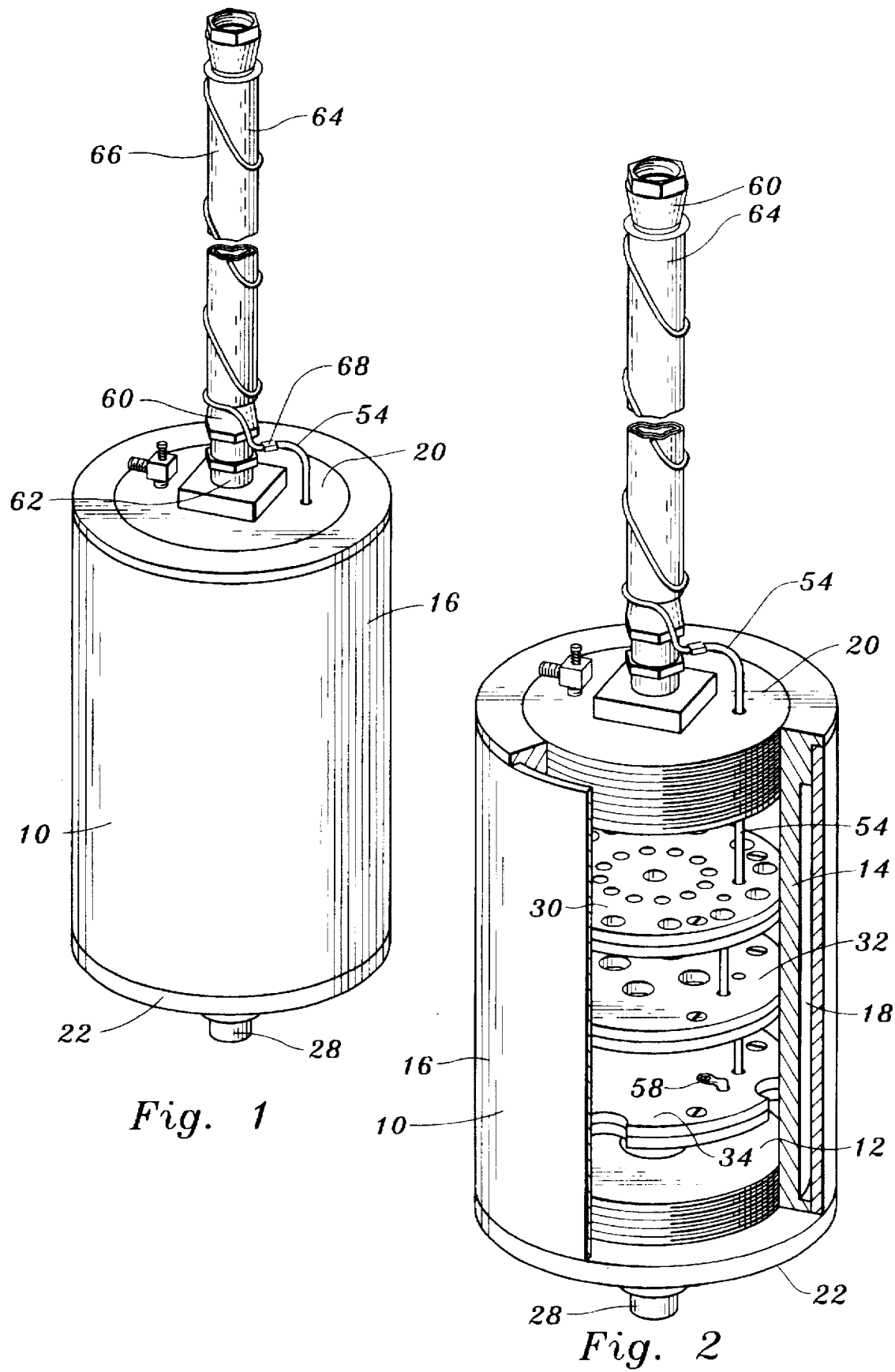
FIG. 1 is a perspective view of apparatus constructed in accordance with the teachings of the present invention.
FIG. 2 is a slightly enlarged perspective view of the apparatus with a portion thereof broken away to disclose interior components thereof.

Referring now to FIGS. 1–7 of the drawings, apparatus constructed in accordance with the teachings of the present invention includes a housing 10 defining a housing interior 12. The housing 10 includes a cylindrically shaped inner sleeve 14 formed of a suitable heat transmitting material, such as aluminum, and an outer protective layer 16 formed of a suitable heat insulating material such as ceramic material. An annular space 18 is defined by the inner and outer sleeves.

Housing 10 also includes two end caps 20, 22 which are threadedly engaged with the inner sleeve 14 or otherwise secured thereto. End cap 22 defines an inlet 24 and end cap 20 defines an outlet 26. The end caps may be formed of any suitable material such as aluminum. At least one fuel injector 28 is secured to end cap 22 and provides for the injection of gasoline or other liquid hydrocarbon fuels into the housing interior 12.

Spaced baffle members 30, 32, 34 are located within the housing interior 12 and divide the housing interior into housing interior segments. These baffle members define openings allowing passage of the liquid hydrocarbon fuel between adjacent housing interior segments as the liquid hydrocarbon fuel passes through the housing interior 12 from the inlet 24 to the outlet 26. The openings in baffle member 30 are designated by reference numeral 40, the openings in baffle member 32 by reference numeral 42, and the openings in baffle member 34 by reference numeral 44.

The baffle members are constructed of suitable heat transmitting material such as aluminum or copper and, in the arrangement illustrated, each of the baffle members has a plate-like configuration and is comprised of two plate members secured together in registry by screws or other mechanical fasteners. The peripheral edges of the baffle members are in engagement with inner sleeve 14 of the housing and fixed in place by any suitable expedient.

Baffle member 30 defines a generally circular channel or void 46. Baffle member 32 defines a generally circular-shaped channel or void 48. And baffle member 34 defines a generally circular-shaped channel or void 50.

Extending through an opening in end cap 20 is a resistance heating element 54 comprised of a wire formed of nickel chromium or other suitable material surrounded by an electrical insulating, heat transmissive layer formed of a silicone substance or other suitable material. The heating element 54 extends between the baffle members and is looped as shown so that portions thereof are positioned in the circular-shaped channels of the baffle members. At the bottom end thereof wire heating element 54 is secured to baffle member 34 by screw 58.

It will be appreciated that when the heating element 54 is heated, the baffle members 30, 32, 34 will be heated also. Furthermore, the inner sleeve 14 of the housing will be heated by the baffle members which, of course, are in engagement therewith.

Secured to and projecting from end cap 20 is a tubular-shaped conduit 60 defining a conduit interior. In the arrangement illustrated, a threaded nipple 62 is employed to secure the conduit to the end cap 20; however, any suitable expedient may be employed for this purpose. Conduit 60 is constructed of a suitable heat transmissive material such as copper and has an electrically insulating, heat transmitting layer 64 formed of a silicone substance or other suitable material wrapped thereabout. Wrapped about conduit 60 and sleeve 64 is a resistance heating wire 66 formed of nickel chromium or other suitable material. Wire 66 extends substantially the full length of conduit 60 and at one end thereof is connected to wire 54 by a electrical connector 68. Thus, a closed electrical circuit incorporating wires 54, 66 will serve to heat both wires simultaneously.

Figure 3:
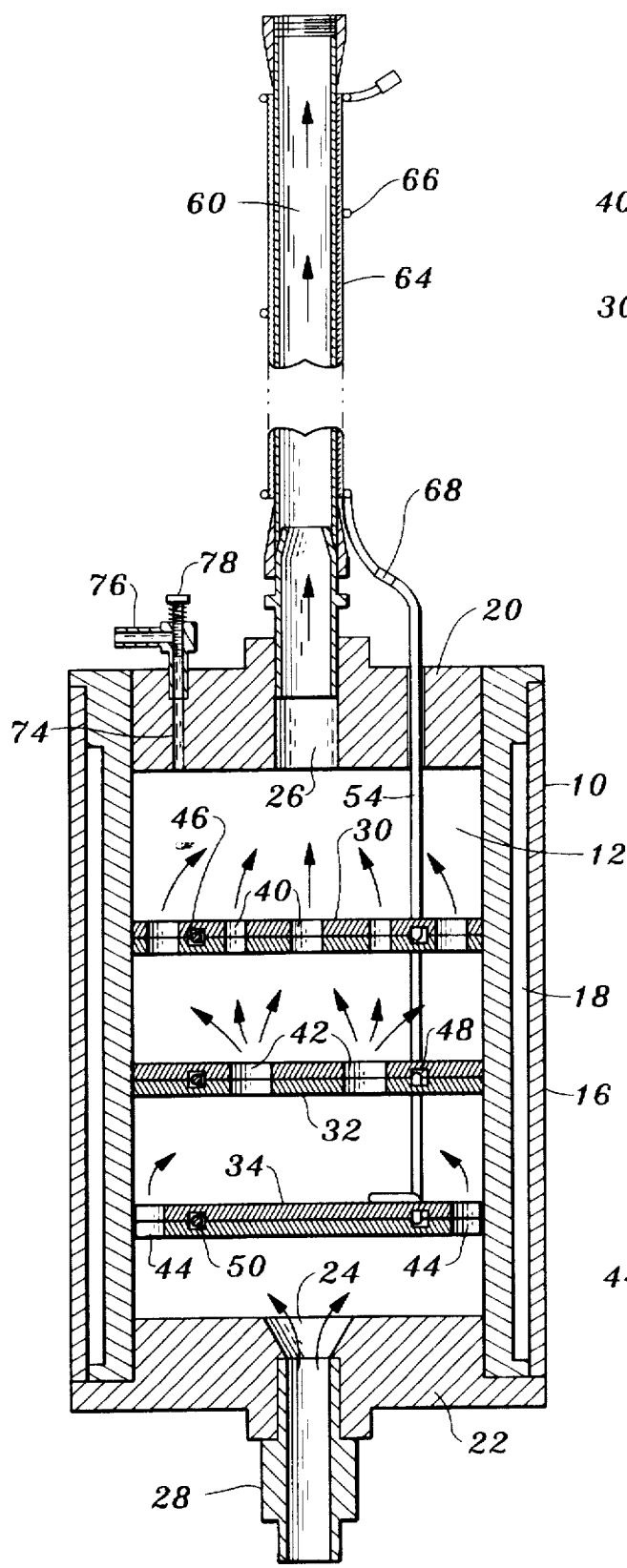
FIG. 3 is a frontal cross-sectional view of the apparatus a portion thereof broken away.
Figure 4:
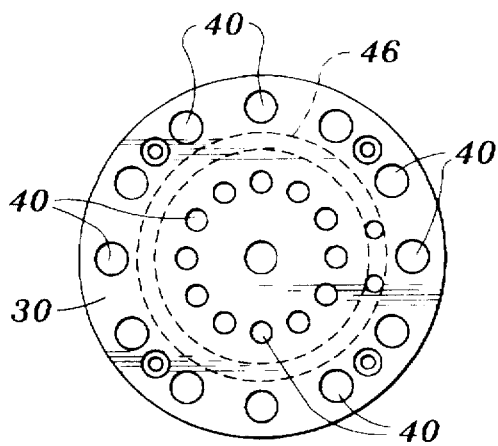
FIGS. 4, 5 and 6 are plan views of three baffle members having differing configurations employed in the apparatus.
Figure 5:
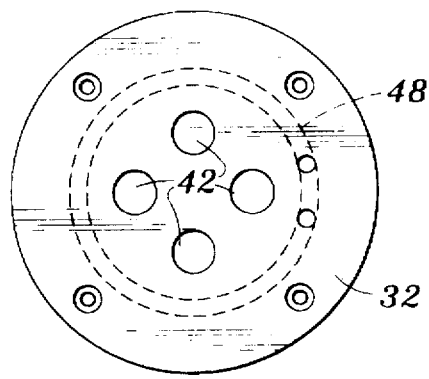
Figure 6:
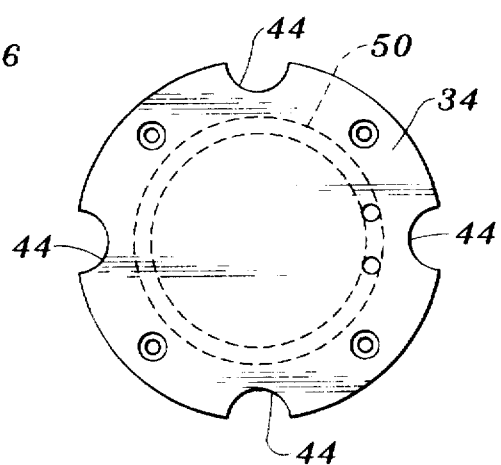
Figure 7:
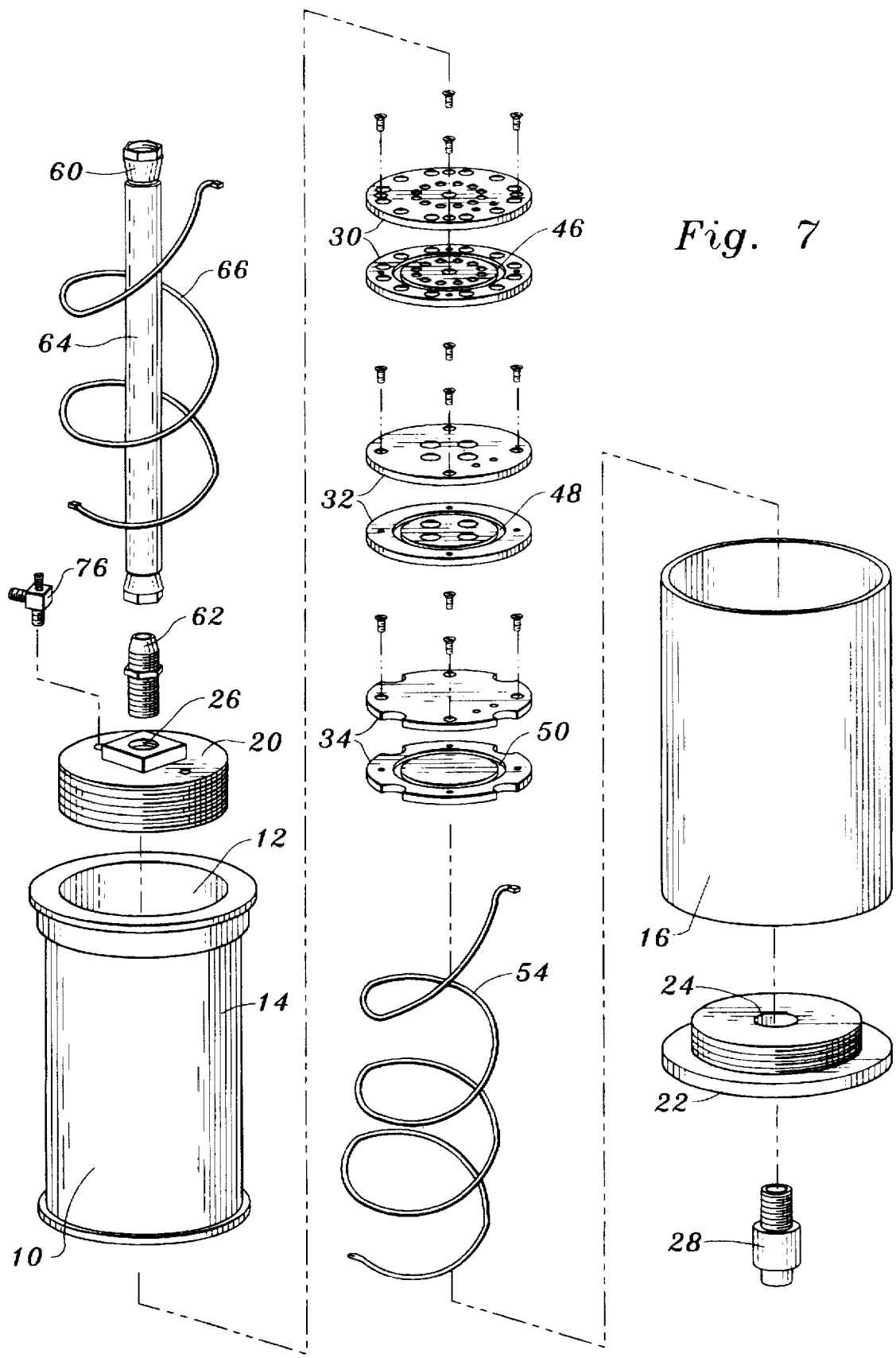
FIG. 7 is an exploded view of the apparatus.

FIG. 3 illustrates with arrows the flow of liquid hydrocarbon fuel through housing 10 during operation of the apparatus. With additional reference to FIG. 8, the fuel is received from a conventional fuel rail and introduced into the interior of the housing through inlet 24. The liquid hydrocarbon fuel, by necessity, must deviate from a straight path as it passes between the inlet and outlet. As a matter of fact, the fuel, which must pass through the openings in the baffle members, follows a number of relatively serpentine paths as the fuel makes its way to the outlet 26. During such movement the fuel contacts the heated baffle members and the heated inner sleeve 14 of the housing. The fuel is thus agitated and heated simultaneously. This results in vaporization of the fuel by the time it reaches outlet 26.

An inlet opening 74 is formed in end cap 20 and a fitting 76 defining a fitting passageway is threadedly engaged or otherwise secured to the end cap 20 so that the fitting passageway is in communication with inlet opening 74. A needle valve 78 is employed to control flow through the fitting passageway and inlet opening 74. Through suitable conduit means (not shown) the passageway of fitting 76 may receive exhaust gases produced by an internal combustion engine (not shown) with which the apparatus is operatively associated. These exhaust gases are mixed with the heated and vaporized liquid hydrocarbon fuel within housing interior 12 just prior to the heated and vaporized fuel exiting outlet 26 into conduit 60.

As stated above, conduit 60 is continuously heated by wire 66. This will result in heating of the mixture of vaporized liquid hydrocarbon fuel and heated exhaust gases within conduit 60. Sufficient heating of the mixture within the confines of the conduit will cause reaction of the mixture with resultant combustion and reformation of at least a portion thereof to a clean usable fuel in the manner suggested by my U.S. Pat. No. 5,515,814, issued May 14, 1996. The mixture exiting the conduit 60 may be directed to the internal combustion engine from which the exhaust gases were received for complete combustion.

Figure 8:
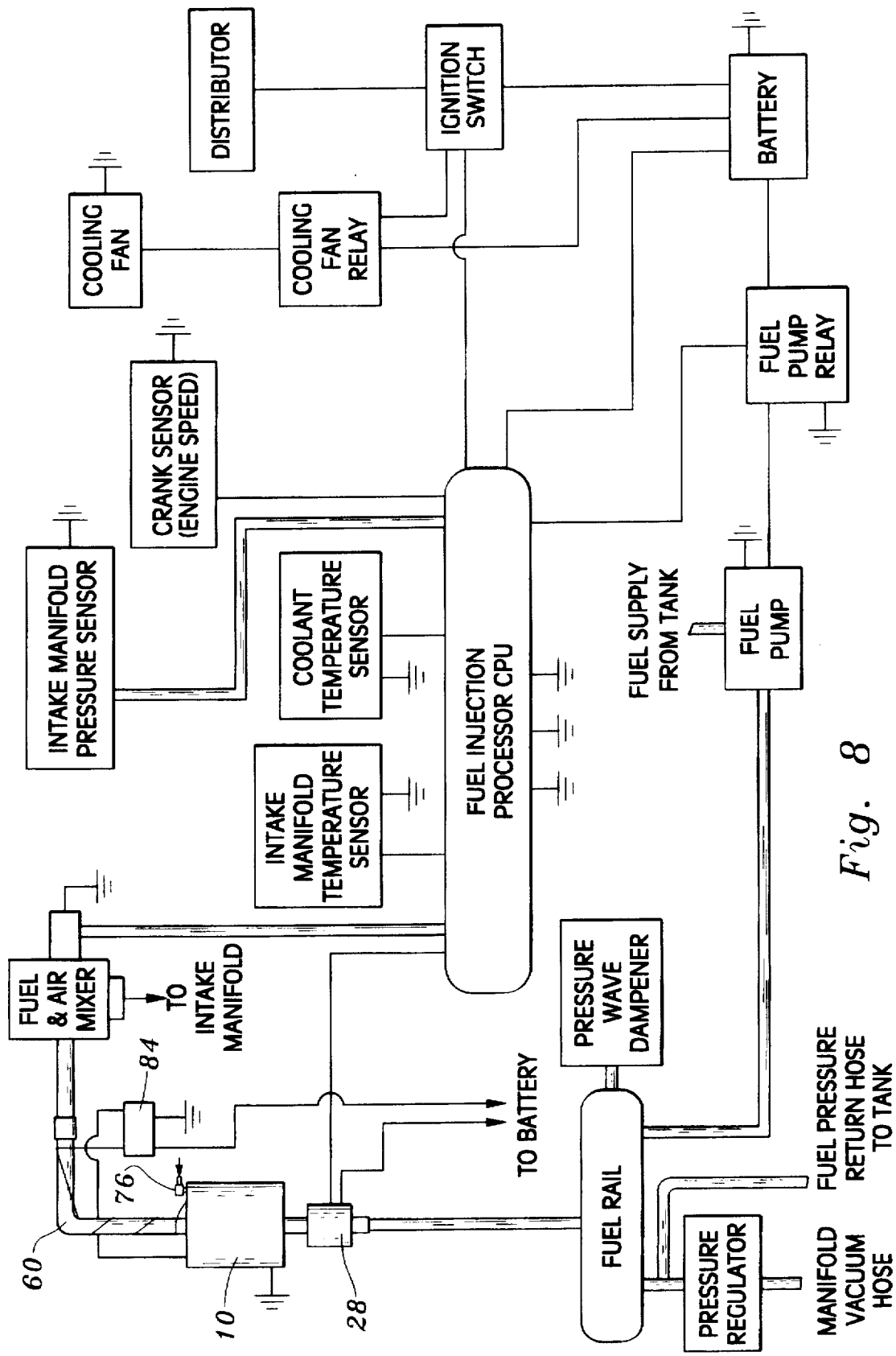
FIG. 8 is a schematic diagram illustrating the apparatus of the present invention in combination with related structure in a representative operating environment.

FIG. 8 shows the apparatus in a typical operating environment with other structure. Since such structure is known in the internal combustion engine and fuel injector art and forms no part of the present invention per se it will not be described in detail.

Suffice it to say that the structure includes a CPU. Inputs to the CPU include those from a crank sensor, an intake manifold pressure sensor, a throttle position sensor, an intake manifold temperature sensor and a coolant temperature sensor.

The CPU is suitably programmed so that the crank sensor input will function to turn the fuel injector 28 on and off. As indicated above, more than one injector may be employed when practicing this invention. The function of the intake manifold pressure sensor is to regulate how long the fuel injector stays open. The throttle position sensor performs a similar function but to a lesser degree. The intake manifold temperature sensor and the coolant temperature sensor inputs provide for slight mixture modification.

The outputs from the CPU go to the fuel injector through the fuel injector drives.

The fuel pump relay is powered by a battery and provides power to the fuel pump. The relay is activated by the ignition switch. The fuel pump is fed fuel from the fuel tank and in turn provides available pressure (e.g. 70 PSI) to the fuel rail. The fuel rail then regulates the fuel supply to the fuel injector at a lesser pressure (e.g. 30 PSI) and returns the rest of the fuel to the fuel tank through a return hose. The fuel injector 28 injects the fuel into the apparatus of the present invention which can be utilized to reform the fuel into a clean useable fuel and supply the reformed fuel to a fuel and air mixer and/or injectors which in turn supplies the correct mixture to the engine. The apparatus may also be employed simply to provide heated vaporized fuel to the engine. A thermostat 84 is employed in the system to control the temperatures applied by wires 54, 66 during operation of the system.

Figure 9:
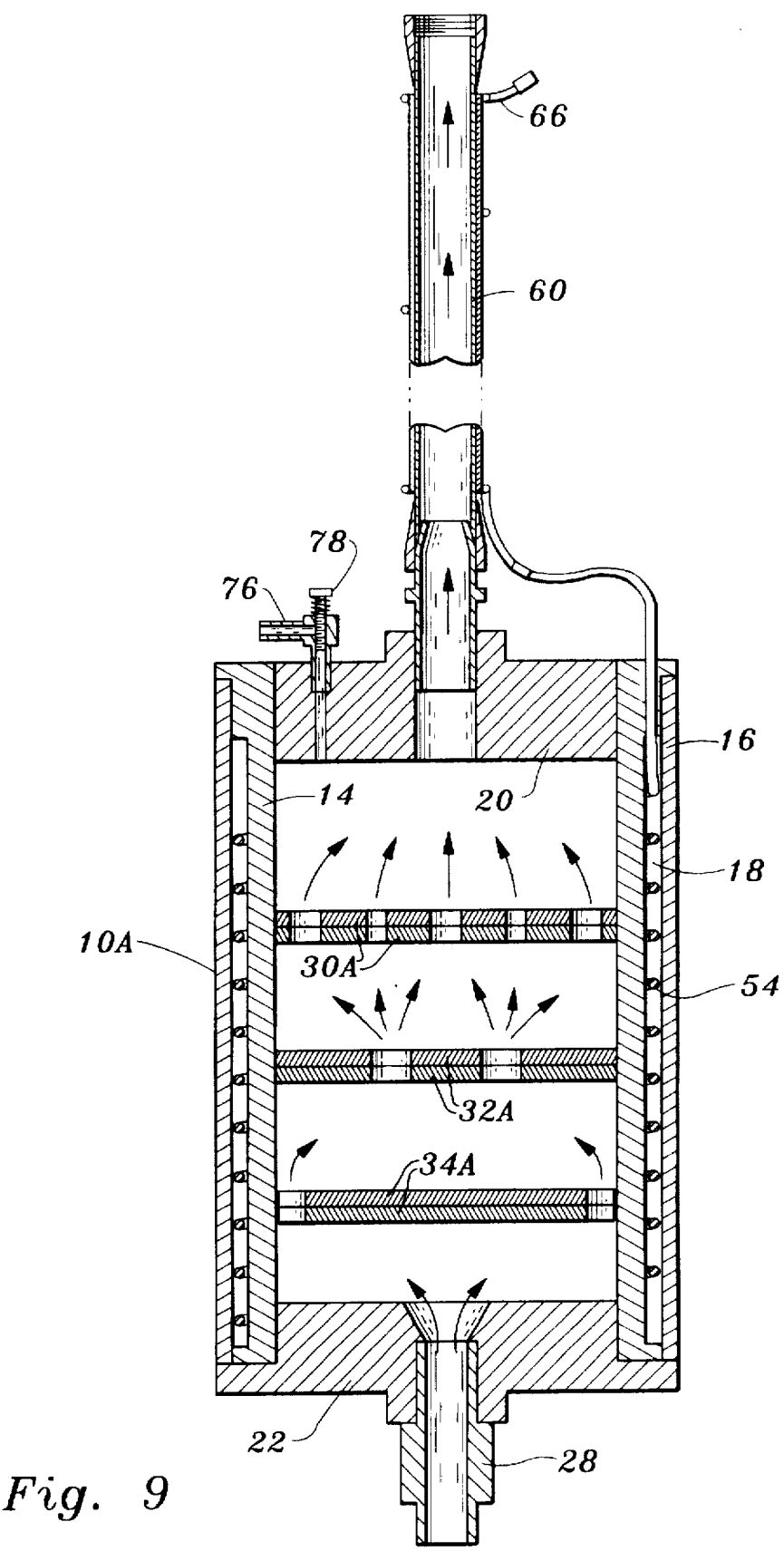
FIG. 9 is a view similar to FIG. 3 but illustrating an alternate form of the apparatus.

FIG. 9 illustrates an alternative embodiment of the apparatus wherein elongated heating element 54 is located in the annular space 18 of the housing and wrapped about inner sleeve 14. The wire is not actually positioned in the housing interior nor in direct engagement with baffle members 30, 32, 34. Instead, heat is supplied to the baffle members by virtue of their engagement with the inner sleeve 14, the latter being directly heated by the wire 54. As with the first embodiment described above, the heating element 54 includes not only the inner electrical resistance element or wire per se but also an electrically insulating sleeve which allows for the transmission of heat from the wire per se to the adjoining structure.

I claim:

1. Apparatus for use with an internal combustion engine for supplying fuel to said internal combustion engine, said apparatus comprising, in combination:

housing means defining a housing interior, said housing means defining an inlet and an outlet, said inlet and said outlet being spaced from one another and communicating with said housing interior, said inlet for receiving liquid hydrocarbon fuel and introducing said liquid hydrocarbon fuel into said housing interior;

a plurality of spaced baffle members located within said housing interior, said baffle members dividing said housing interior into housing interior segments and each of said baffle members defining at least one opening allowing passage of said liquid hydrocarbon fuel between adjacent housing interior segments as said liquid hydrocarbon fuel passes through said housing interior from said inlet to said outlet;

heating means for heating said baffle members, said baffle members heated by said heating means heating and promoting the vaporization of said liquid hydrocarbon fuel as said liquid hydrocarbon fuel passes through said housing interior from said inlet to said outlet; and a conduit leading from said housing means outlet and defining a conduit interior communicating with said housing interior, said heating means including an elongated electrical resistance element operatively associated with said conduit and extending along said conduit to heat said conduit and further heat the liquid hydrocarbon fuel after the liquid hydrocarbon fuel has exited said housing interior from said outlet.

2. The apparatus according to claim 1 wherein said housing includes a housing wall extending around said baffle members, said heating means cooperable with said housing wall to heat said housing wall.

3. The apparatus according to claim 1 wherein said heating means includes electrical resistance heater means positioned in said housing interior and located adjacent to said baffle members.

4. The apparatus according to claim 2 wherein said heating means includes electrical resistance heater means extending along and closely adjacent to said housing wall.

5. The apparatus according to claim 4 wherein said electrical resistance heater means is elongated and extends about the periphery of said housing wall.

6. The apparatus according to claim 3 wherein said baffle members define voids, said electrical resistance heater means positioned in said voids.

7. The apparatus according to claim 6 wherein said voids comprise channels, said electrical resistance heater means being elongated, positioned in said channels and extending between said baffle members.

8. The apparatus according to claim 7 wherein at least some of said baffle members are plates including two plate members secured together and defining at least one of said channels, said elongated electrical resistance heater being disposed between said two plate members.

9. The apparatus according to claim 2 wherein said baffle members are in engagement with said housing wall for providing conductive heat transfer between said baffle members and said housing wall.

10. The apparatus according to claim 5 wherein said housing wall defines an annular space accommodating said elongated electrical resistance heater means.

11. The apparatus according to claim 1 wherein openings of adjacent baffle members are out of registry whereby liquid hydrocarbon fuel passing through said inlet to said outlet deviates from a straight path and is agitated by impacting said baffle members.

12. The apparatus according to claim 1 wherein said housing means additionally comprises an inlet opening for introducing internal combustion engine exhaust into said housing interior to mix with the liquid hydrocarbon fuel passing through said housing interior from said inlet to said outlet.

13. The apparatus according to claim 12 additionally comprising flow control means for controlling the flow of internal combustion engine exhaust into said housing interior through said inlet opening.

14. The apparatus according to claim 3 additionally comprising thermostat means for controlling the operation of said electrical resistance heater means.

* * * * *